June 23, 1964     L. W. JOHNSON     3,137,869
WHEEL CHAIR WITH POWER LIFT MEANS
Filed May 18, 1962     3 Sheets-Sheet 1
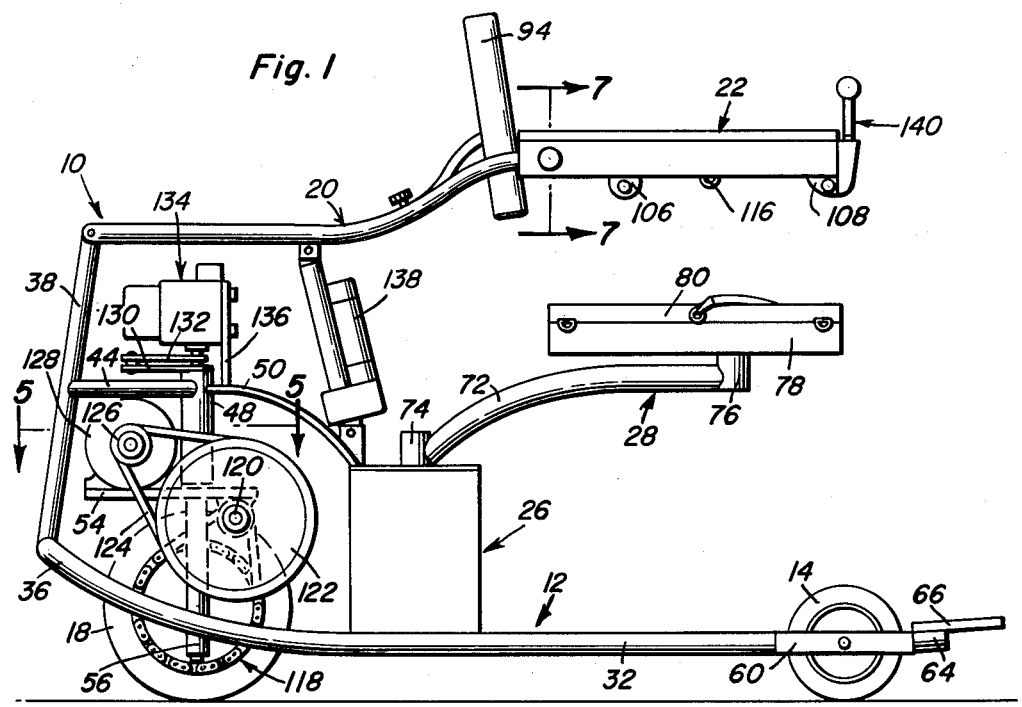
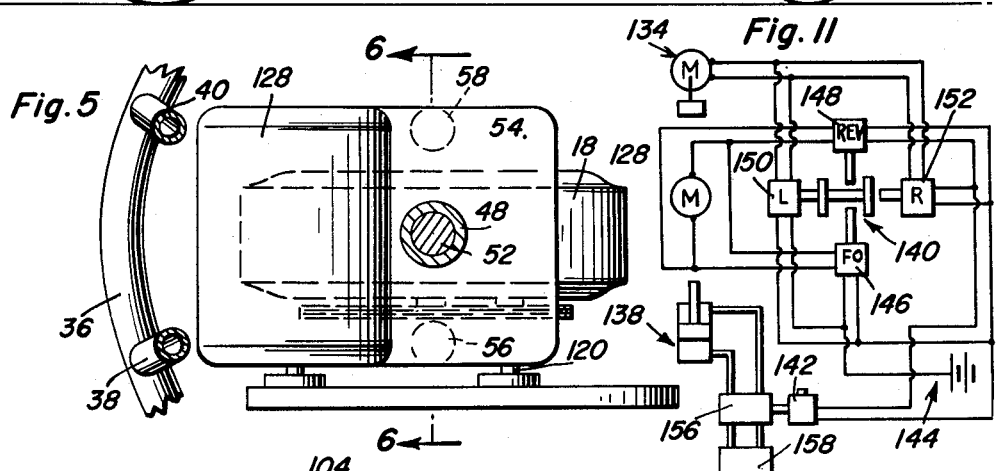
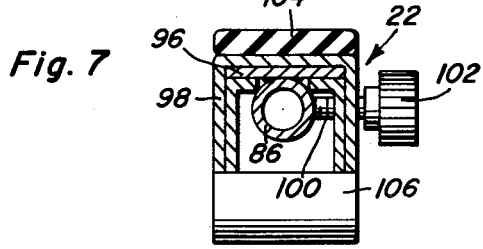
Lenard W. Johnson
INVENTOR.

June 23, 1964     L. W. JOHNSON     3,137,869
WHEEL CHAIR WITH POWER LIFT MEANS
Filed May 18, 1962     3 Sheets-Sheet 2

Lenard W. Johnson
INVENTOR.

June 23, 1964  L. W. JOHNSON  3,137,869
WHEEL CHAIR WITH POWER LIFT MEANS
Filed May 18, 1962  3 Sheets-Sheet 3

Lenard W. Johnson
INVENTOR.

BY *Clarence A. O'Brien*
and *Harvey B. Jackson*
Attorneys

United States Patent Office 3,137,869
Patented June 23, 1964

3,137,869
WHEEL CHAIR WITH POWER LIFT MEANS
Lenard W. Johnson, Rte. A, Roseau, Minn.
Filed May 18, 1962, Ser. No. 195,816
14 Claims. (Cl. 5—86)

This invention relates to a self-powered vehicle for transporting of invalids, transfer of invalids from one location to another, exercising and handling of invalids in general.

A primary object of the present invention is to provide a multi-purpose vehicle for the handling of invalids. Thus, a new and useful apparatus has been devised for accomplishing a variety of functions in a manner which is mutually beneficial.

In accordance with the foregoing object, one important purpose of the invalid vehicle of the present invention is to facilitate transfer of an invalid to and from the vehicle by means of a sling arrangement capable of being directly positioned over the invalid receiving or deposit location despite its mounting on the vehicle.

Another objective to be achieved by the invalid apparatus is to provide a vehicle having a rear mounting portion with a forward relatively low approach portion supported by a pair of small diameter supporting wheels capable of guiding the forward portion of the vehicle under the invalid receiving or deposit station such as a bed, the driving and steering portion of the vehicle being mounted adjacent the rear end of the vehicle frame. Thus, a single relatively large diameter dirigible wheel supports the vehicle in conjunction with the forwardly located front supporting wheels, the large diameter rear wheel also being the driving wheel for the vehicle.

A still further object of the present invention in accordance with the foregoing objects, is to provide an invalid vehicle having a rearwardly mounted lift assembly supporting a pair of parallel spaced body engaging elements or armrests above the forward approach portion of the vehicle do not only assist an invalid in performing walking exercises but to also mount the control devices for operating the vehicle and to support an invalid transfer sling adapted to be elevated and lowered by the lift assembly on which the armrests are mounted.

An additional object of the present invention is to provide an invalid vehicle having a rigid supporting seat assembly capable of comfortably supporting an invalid for prolonged periods, the seat assembly being laterally pivotable into an out-of-the-way position so that the vehicle may be utilized in conjunction with the sling support mounted on the armrests, as an invalid exercising device. The armrests, which are mounted on the lift assembly, are therefore slidably adjustable for accommodating an invalid or patient in an erect position, the armrests also having means for mounting thereon, a pair of crutch supports for such purpose.

These together with other objects and advantages which become subsequently apparent reside in the details of construction and operation as more fully hereinafter described and claimed, reference being had to the accompanying drawings forming a part hereof, wherein like numerals refer to like parts throughout, and in which:

FIGURE 1 is a side elevational view of one form of an invalid vehicle constructed in accordance with the principles of the present invention.

FIGURE 5 is a partial sectional view taken substantially through a plane indicated by section line 5—5 in FIGURE 1.

FIGURE 7 is a partial sectional view taken substantially through a plane indicated by section line 7—7 in FIGURE 1.

FIGURE 11 is a diagrammatic illustration of the power controls associated with the invalid vehicle.

Figure 2:
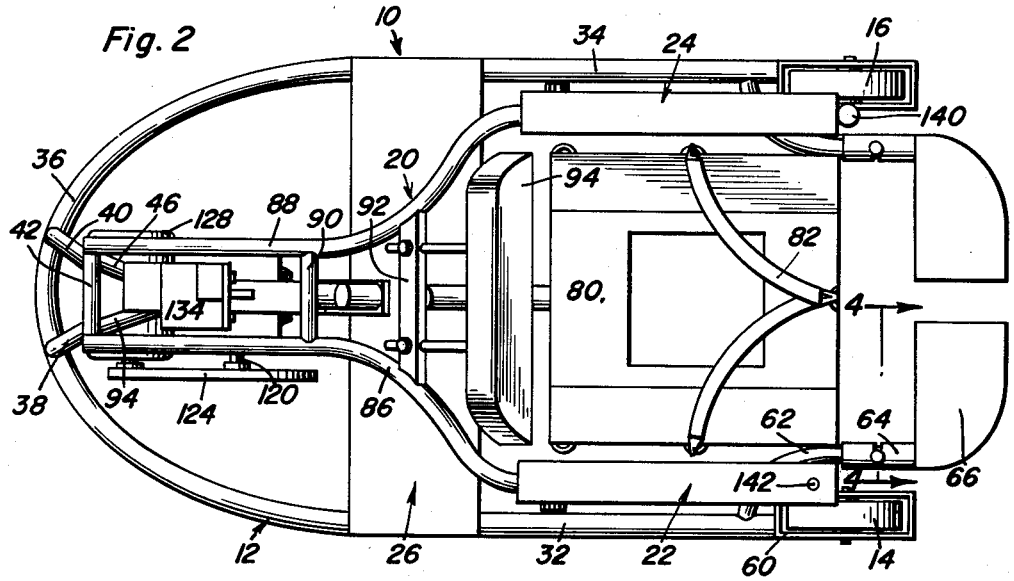
FIGURE 2 is a top plan view of the vehicle illustrated in FIGURE 1.
Figure 3:
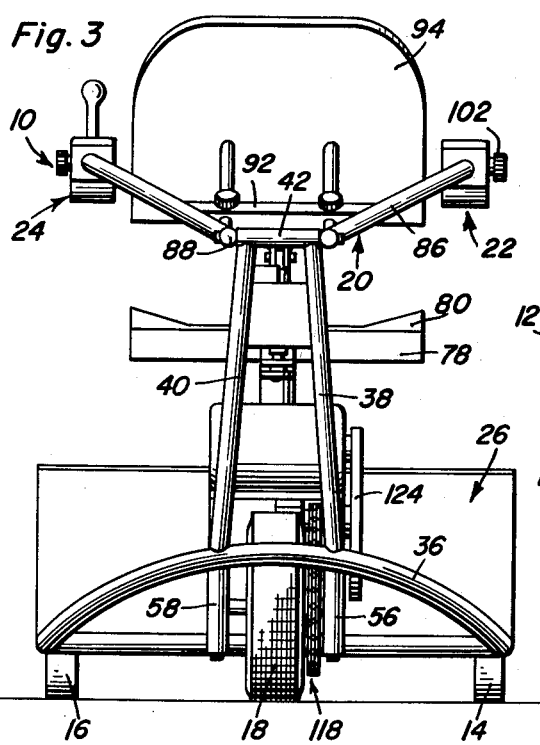
FIGURE 3 is a rear elevational view of the vehicle.
Figure 9:
FIGURE 9 is a side elevational view of the invalid vehicle with an enclosing housing being utilized as a walk exercising apparatus.

Referring now to the drawings in detail, FIGURES 1, 2 and 3 illustrate one form of invalid vehicle generally referred to by reference numeral 10. The vehicle consists essentially of a main frame assembly generally referred to by reference numeral 12 which is supported in spaced relation above the ground by means of a pair of front supporting wheels 14 and 16 which are widely spaced apart adjacent a forward end of the vehicle, and a power driven dirigible wheel 18 mounted adjacent a rear end of the vehicle. Pivotally mounted by the main frame assembly 12 at the rear end of the vehicle, is a power-operated lift assembly generally referred to by reference numeral 20, the forward end portions of which adjustably mount a pair of body engaging armrest assemblies 22 and 24. Mounted on the frame assembly 12 intermediate the forward and rear ends thereof, is a power supply housing generally referred to by reference numeral 26 which also constitutes a mounting support for a rigid supporting seat assembly generally referred to by reference numeral 28 which is swingable in a lateral direction to an out-of-the-way location as illustrated in FIGURE 9, for example. The rigid supporting seat assembly 28 when in an operative position, extends forwardly from its mounting support on the housing 26 below the forward portion of the lift assembly 20 and above the forward approach portion of the vehicle frame assembly 12 disposed forwardly of the housing 26. The portion of the vehicle frame assembly 12 disposed rearwardly of the housing 26 mounts power driving and controlling equipment at a relatively higher location above the forward approach portion of the vehicle frame assembly. This rear portion of the vehicle frame assembly illustrated for example in FIGURE 1, may be enclosed within a housing, if desired, as shown in FIGURE 9 for example, wherein the enclosing housing 30 is provided.

Figure 6:
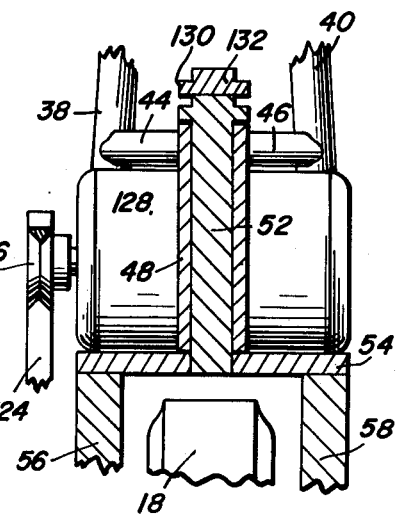
FIGURE 6 is a partial sectional view taken substantially through a plane indicated by section line 6—6 in FIGURE 5.
Figure 4:
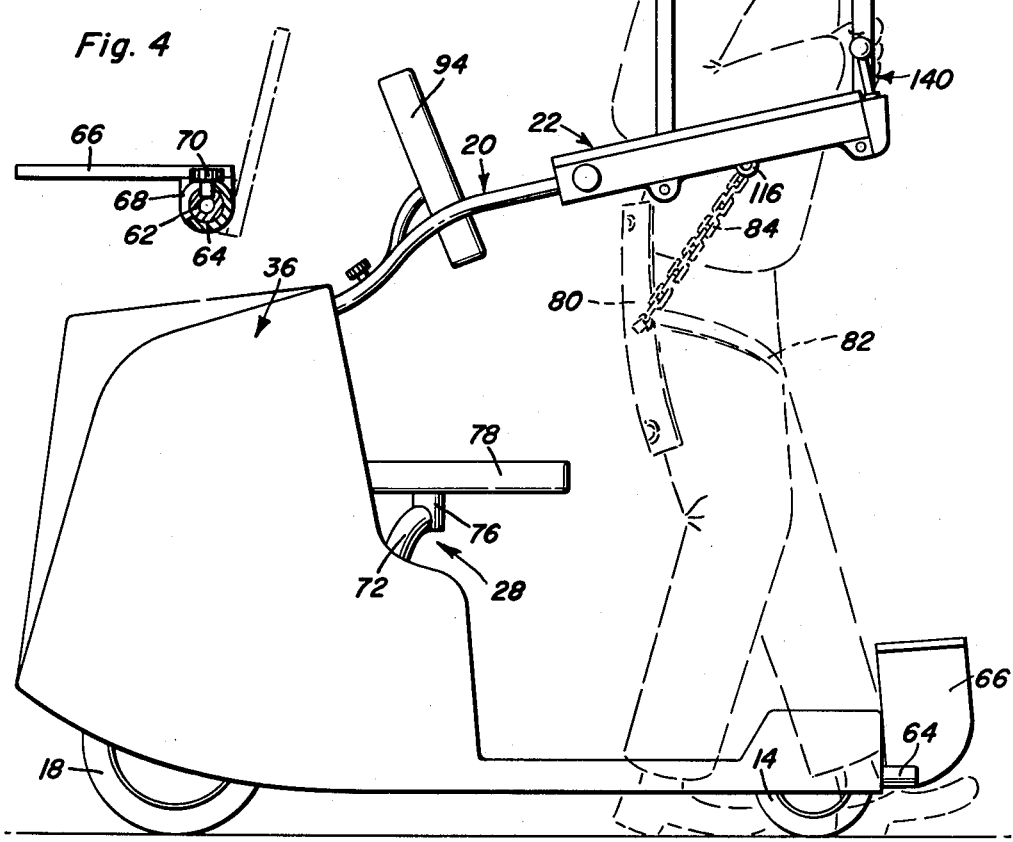
FIGURE 4 is a partial sectional view taken substantially through a plane indicated by section line 4—4 in FIGURE 2 illustrating a foot rest in both a foot supporting position and in an inoperative position by dotted lines.

The vehicle frame assembly 12 includes an elongated frame member generally disposed parallel to a horizontal plane spaced a short distance above the ground by means of the front wheels 14 and 16 and the rear driving wheel 18. The elongated tubular frame member includes a pair of parallel spaced forward sections 32 and 34 as more clearly seen in FIGURE 2 which are interconnected by a curved section 36 which curves upwardly toward the rear end of the frame assembly as more clearly seen in FIGURES 1 and 3. Connected to the rear end of the curved section 36 are a pair of tubular frame members 38 and 40 which extend vertically upward and terminate at a pivotal connecting member 42 which interconnects the frame members 38 and 40 at their upper ends and also pivotally mount the lift assembly 20. A pair of forwardly extending frame members 44 and 46, as more clearly seen in FIGURES 1 and 6, are respectively connected to the vertically extending frame members 38 and 40 to support at their forward terminal ends, a fixed vertically extending sleeve member 48 which is also connected to the connecting bridge member 50 secured to the top of the housing 26. The fixed sleeve 48 journals a vertical steering shaft 52 which is rigidly connected at its lower end to a supporting plate member 54. The plate member 54 rotatably mounts the driving wheel 18 therebelow by means of a pair of straddling shaft members 56 and 58 projecting downwardly from the plate member 54. The wheel 18 which is of a relatively large diameter as compared to the front supporting wheels 14 and 16, is thereby rotatably mounted about a horizontal axis and is capable of being turned about a vertical axis extending through the steering shaft 52. The front supporting wheels 14 and 16, on the other hand, are rotatably mounted by horizontal axles which extend through wheel supporting portions 60 connected to the forward terminal ends of the parallel spaced frame sections 32 and 34. Each of the forward frame sections 32 and 34 is thereby supported relatively close to the ground by small diameter wheels so that the forward approach portion of the vehicle may move underneath a bed or other such furniture in order to bring the seat assembly 28 and the armrest assemblies 22 and 24 thereabove. Also connected to the frame sections 32 and 34, on the confronting sides thereof, are foot rest supporting members 62 which curve forwardly in parallel relation to the front wheel mounting portions 60 to pivotally support about horizontal axes which extend in a direction of vehicle movement, mounting sleeves 64 to which the foot rest members 66 are connected. The sleeves 64 are therefore provided with arcuate slots 68 through which the limit pins 70 extend, said limit pins being connected to the foot rest supporting members 62. The foot rest member 66 may thereby be pivotally displaced from a position shown by solid line in FIGURE 4 to a position shown in dotted lines. In the position illustrated in FIGURE 2, the foot rest members 66 extend in a lateral direction toward each other so that an invalid seated on the seat assembly 28 may support the feet on the foot rest members 66. When, however, the apparatus is being utilized for walking exercises, the foot rest member 66 will be displaced to the positions illustrated by dotted line in FIGURE 4 and by solid lines in FIGURE 9 so as to leave the space between the forward ends of the frame assembly, free and unobstructed.

Figure 8:
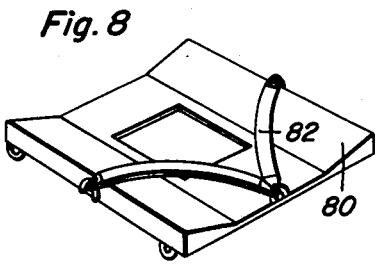
FIGURE 8 is a perspective view of the flexible sling seat associated with the invalid vehicle of the present invention.

The rigid supporting seat assembly 28 includes a pivotal supporting arm 72 which is swingable in a lateral direction from the position illustrated in FIGURE 1 to the position illustrated in FIGURE 9. The arm 72 is therefore pivotally mounted about a vertical axis by the journal sleeve member 74 projecting above the top of the housing 26. Connected to the arm 72 at its forward end by means of the member 76, is a seat cushion member 78 adapted to have connected thereto in any suitable fashion, a flexible pad member 80 which may also form part of an invalid's body engaging sling assembly. As more clearly seen in FIGURES 8 and 9, the pad 80 is provided with a pair of hooked anchored strap elements 82 that may be placed about the thighs of the invalid in order to secure the individual to the supporting pad 80. The pad 80 may be slung by a pair of chain elements 84 from the bottom of the armrest assemblies 22 and 24 which are adjustably mounted on the forward end portions of the lift assembly 20.

The power-operated lift assembly 20 includes a pair of elongated frame members 86 and 88 which are more closely spaced above the rear portion of the vehicle frame assembly 12 for pivotal connection to the pivotal mounting member 42. The frame members 86 and 88 are further interconnected by a brace member 90 and extend therefrom in a forward direction to diverge into widely spaced forward portions to which the armrest assemblies 22 and 24 are connected on opposite lateral sides of the seat assembly as more clearly seen in FIGURE 2. The diverging portions of the frame elements 86 and 88 are also interconnected by a back rest mounting element 92 by means of which the back rest 94 is held in adjustably spaced relation to the seat assembly 28. The arm rest assemblies are therefore disposed just forwardly of the back rest 94.

Figure 10:
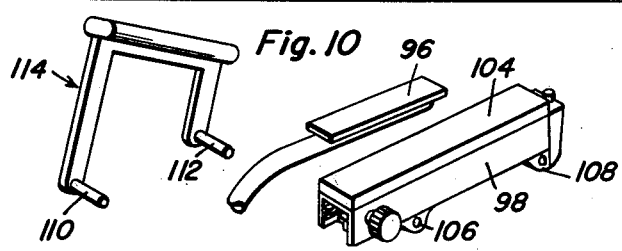
FIGURE 10 is a perspective view of some disassembled portions of the vehicle and apparatus associated therewith.

Referring now to FIGURES 7 and 10 in particular, it will be observed that the forward end of each frame member 86 and 88 has welded thereto, an elongated plate element 96 adapted to slidably support a downwardly opening channel member 98. The channel member 98 is held in adjusted position by means of a screw member 100 which extends through the channel member 98 and bears against the side of the tubular frame member 86 or 88. An adjustment knob element 102 is therefore connected to the end of the locking screw element 100 in order to release and relock the channel member in adjusted position. A pad 104 is mounted on top of the channel member 98 for cushion support of an individual's arm. Connected across the open bottom of the channel members 98 are a pair of pin receiving bracket elements 106 and 108 adapted to receive the pins 110 and 112 respectively, which project from a special body supporting crutch element 114. It will therefore be apparent, that a pair of crutch arm supports may be removably attached to the armrest assemblies 22 and 24 so that underarm support for an invalid may be provided in proper forward adjusted positions of the armrest assemblies 22 and 24 when the lift assembly 20 is elevated for support of an invalid when the vehicle is being used for walking exercise as illustrated in FIGURE 9. When used in this manner, the seating pad 80 strapped to the legs of the invalid will be hooked on either side of the pad 80 to the chains 84 which in turn are slung from the bottom of the armrest assemblies 22 and 24 by means of the connecting eyes 116. Also, when so used, the rigid seat assembly 28 will be swung to its out-of-the-way position.

Referring once again to FIGURES 1, 2 and 3, it will be observed that the rear dirigible wheel 18 is drivingly connected by means of a sprocket drive 118 to a jack shaft 120 rotatably mounted on and below the supporting plate member 54. A large pulley wheel 122 is connected to the jack shaft 120 and is belt connected by the pulley belt 124 to the drive pulley 126 affixed to the power shaft of an electric motor 128 constituting the prime mover for propelling the vehicle 10. The motor 128 is therefore mounted above the supporting plate 54 so that it will be rotatable with the wheel 18 about the vertical steering axis through the steering shaft 52 together with a driving connection established between the motor 128 and the wheel 18 by the belt pulley and sprocket drive at a high reduction ratio. The upper end of the steering shaft 52 is therefore connected to a lever element 130 which is in turn pin connected to a lever member 132, the lever member 132 being connected to the output shaft of a power steering unit 134 of any suitable type. The power steering unit 134 is therefore fixedly mounted on the vehicle frame by means of the mounting elements 136 connected to the bridging element 50 between the housing 26 and the fixed journal sleeve 48. Also pivotally connected between the housing 26 and the lift assembly 20, is a power cylinder piston device 138 arranged to elevate and lower the lift assembly 20 with respect to the vehicle frame. The invalid seated on the rigid seat assembly 28 may therefore control operation of the apparatus including the energization of the propelling motor 128 which is of the reversible control type in order to propel the vehicle either forwardly or rearwardly, forward and reverse energization of the power steering unit 134 in order to steer the vehicle to the left or to the right and energization of the power cylinder device 138 in order to elevate or lower the lift assembly 20. Controls are therefore conveniently mounted on the armrest assemblies for such purpose. The armrest assembly 24 may therefore be provided with a control handle 140 at its forward end adapted to be pushed forwardly or rearwardly in order to energize the propelling motor 128 in one direction or the other. The same control handle 140 may be displaced in a lateral direction in order to energize the power steering unit 134 to control steering of the vehicle. Finally, the control switch button 142 may be provided on the armrest assembly 22 so that the occupant of the vehicle may control energization of the power cylinder device 138 to raise or lower the lift assembly 20. By way of example only, a control system is diagrammatically illustrated in FIGURE 11, wherein the battery source of power 144 adapted to be mounted within the housing 26 will supply energizing current to energize the vehicle propelling motor 128 in a forward or reversed direction when a forward or reverse control switch mechanism 146 and 148 is actuated by displacement of the control handle 140 in a forward or reversed direction. Displacement of the control handle 140 in a lateral direction may alternatively actuate the switch mechanism 150 and 152 for energizing the steering power unit 134 in the proper direction. The battery source of current 144 may also be utilized for control of the switch mechanism 142, to operate a reversing valve mechanism 154 for hydraulic operation of the power cylinder device 138 in the proper direction, energized by a hydraulic source of power 158 that may also be located within the housing 26. It will be appreciated, of course, that many other types of control systems and associated mechanisms may be utilized to accomplish the same purposes.

From the foregoing description, the operation and utility of the invalid handling vehicle of the present invention will be apparent. It will therefore be appreciated, that the particular arrangement of parts and construction of the vehicle, enables the occupant of the vehicle to control its movement and to bring portions of the vehicle below and above a bed for example so that the invalid may be easily transferred to or from the vehicle inasmuch as the rigid seat assembly 28 and armrest assemblies 22 and 24 will be positioned above the bed. The vehicle when being utilized for transportation purposes, will provide a comfortable support for the occupant, because of the relationship between the rigid seat assembly 28, the back rest 94 and the armrest assembly 22 and 24. When, however, it is desired to utilize the vehicle for delicate patient transfer purposes, the sling pad 80 may be connected to the armrest assemblies 22 and 24 by the chains 84 and the lift assembly 20 elevated so that the patient will clear the seat cushion 78. The rigid seat assembly 28 may then be swung to its out-of-the-way position and the patient lowered by control over the power cylinder device 138, onto the receiving location such as a bed or operating table, etc. With the rigid seat assembly 28 in an out-of-the-way position, the vehicle may also be utilized for walking exercises, in which case the armrest assemblies 22 and 24 will be adjustably shifted in a forward direction and the crutch supports 114 mounted thereon. The lift assembly 20 will then be elevated to a position in accordance with the height of the invalid and the foot rest 66 displaced to an out-of-the-way position so as to remove the foot rest which would otherwise obstruct the invalid's feet. The frame assembly of the vehicle is therefore constructed in such a manner as to accommodate walking exercises as well as to enable the vehicle to be moved to the position aforementioned facilitating transfer of a patient to or from the vehicle.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. An invalid handling vehicle comprising, frame means having a relatively high rear portion and a low forward approach portion, dirigible wheel means of relatively large diameter supporting said frame means at said rear portion, spaced supporting wheel means of smaller diameter supporting said frame means at said low approach portion, seat means movably mounted on said rear portion of the frame means and projecting forwardly therefrom for support of an invalid above the forward approach portion rearwardly of and between said spaced supporting wheel means, and armrest means movably connected to said rear portion of the frame means extending forwardly therefrom in vertically spaced relation above the seat means to facilitate transfer of the invalid to and from the vehicle, said seat means comprising, rigid support means pivotally mounted by the frame means for displacement in a lateral direction between an operative position vertically aligned with a back rest above the frame means and an inoperative position out of alignment with the armrest means, and invalid supporting sling means disconnectibly connected to said armrest means for vertical displacement by the armrest means from a rest position on the rigid support means.

2. The combination of claim 1, including power means mounted on said rear portion of the frame means for driving and turning the dirigible wheel means and pivotally displacing the arm rest means and control means mounted on the arm rest means and operatively connected to the power means for propelling and steering the vehicle and controlling the seat means by displacement of the armrest means for invalid movement relative to the vehicle.

3. The combination of claim 2, wherein said arm rest means comprises, lift means pivotally connected to the frame means for powered movement in a vertical direction, spaced bracket means adjustably mounted on said lift means on opposite lateral sides of said invalid sling means connected thereto.

4. The combination of claim 3, including crutch support means removably mounted on said spaced bracket means.

5. The combination of claim 4, wherein said frame means includes an elongated frame member having a pair of parallel spaced sections rotatably mounting said spaced supporting wheel means at forward terminal ends thereof, said parallel spaced sections being interconnected by an upwardly curved rear end section, and a pair of foot rests connected to said forward terminal ends of the spaced parallel sections extending laterally toward each other in a foot supporting position.

6. An invalid handling vehicle comprising, frame means having a relatively high rear portion and a low forward approach portion, dirigible wheel means of relatively large diameter supporting said frame means at said rear portion, spaced supporting wheel means of the forward diameter supporting said frame means at said low approach portion, seat means movably mounted on said rear portion of the frame means and projecting forwardly therefrom for support of an invalid above the forward approach portion rearwardly of and between said spaced supporting wheel means, armrest means movably connected to said rear portion of the frame means extending forwardly therefrom in vertically spaced relation above the seat means to facilitate transfer of the invalid to and from the vehicle, said armrest means comprising, lift means pivotally connected to the frame means for powered movement in a vertical direction, spaced bracket means adjustably mounted on said lift means on opposite lateral sides of said frame means, invalid sling means connected to said spaced bracket means, and crutch support means removably mounted on said spaced bracket means.

7. An invalid handling vehicle comprising frame means having a relatively high rear portion and a low forward approach portion, dirigible wheel means supporting said frame means at said rear portion, spaced supporting wheel means supporting said frame means at said low approach portion, body engaging means movably mounted on said rear portion of the frame means and projecting forwardly therefrom for support of an invalid above the forward approach portion, power means mounted on said rear portion of the frame means for driving and turning the dirigible wheel means, power-operated lift means operatively connected to said power means and said body engaging means and control means operatively connected to the power means for propelling and steering the vehicle and controlling the body engaging means by displacement of the lift means for invalid movement relative to the frame means.

8. The combination of claim 7, wherein said body engaging means comprises, rigid support means pivotally mounted by the frame means for displacement in a lateral direction between an operative position vertically aligned with a back rest above the frame means and an inoperative position out of alignment with the arm rest means, and invalid supporting sling means disconnectibly connected to said arm rest means for vertical displacement by the armrest means from a rest position on the rigid support means.

9. An invalid handling vehicle comprising, frame means having a rear portion and a forward approach portion, wheel means supporting said frame means, seat means movably mounted on said rear portion and projecting forwardly therefrom above the forward approach portion, lift means pivotally connected to said frame means for powered movement in a vertical direction, spaced bracket means adjustably mounted on said lift means extending forwardly therefrom in vertically spaced relation above the seat means to facilitate transfer of the invalid to and from the vehicle, and crutch support means removably mounted on said spaced bracket means.

10. The combination of claim 9, wherein said seat means comprises rigid support means pivotally mounted by the frame means for displacement in a lateral direction between an operative position between said spaced bracket means and an inoperative position angularly displaced therefrom, and invalid supporting sling means disconnectibly connected to said spaced bracket means for vertical displacement by the lift means from a rest position on the rigid support means.

11. An invalid handling vehicle comprising, frame means having a rear mounting portion and a forward approach portion substantially lower than said rear portion, wheel means supporting said frame means, seat means movably mounted on said rear portion and projecting forwardly therefrom above the forward approach portion, armrest means movably connected to said rear portion of the frame means extending forwardly therefrom in vertically spaced relation above the seat means to facilitate transfer of the invalid to and from the vehicle, said armrest means comprising, lift means pivotally connected to the frame means for powered movement in a vertical direction, spaced bracket means adjustably mounted on said lift means on opposite lateral sides of said frame means and invalid sling means connected to said spaced bracket means, and crutch support means removably mounted on said spaced bracket means.

12. An invalid handling vehicle comprising, a wheeled frame assembly, power means mounted on said frame assembly, seat means displaceably mounted on said assembly for movement between an operative and an inoperative position, body engaging means disposed in one position for cooperative support of an invalid seated on the seat means when in the operative position thereof, and power operated means energized by said power means for displacing said body engaging means away from said one position to support the invalid when the seat means is in the inoperative position for transfer purposes.

13. The combination of claim 12 wherein said body engaging means comprises, laterally spaced armrests and a back rest mounted on the power-operated means, a pad adapted to be supported on the seat means and flexible means for connecting the pad to the armrests.

14. The combination of claim 13 including a body supporting element removably mounted on the armrests.

References Cited in the file of this patent

UNITED STATES PATENTS

| | | |
|---|---|---|
| 2,375,907 | Farmer | May 15, 1945 |
| 2,792,052 | Johannesen | May 14, 1957 |
| 2,798,565 | Rosenthal et al. | July 9, 1957 |
| 2,991,485 | Schulte | July 11, 1961 |